UNITED STATES PATENT OFFICE 2,443,811

PRODUCTION OF THIOPHENOLS

De Loss E. Winkler, Berkeley, and Seaver A. Ballard, Oakland, Calif., assignors to Shell Development Company, San Francisco, Calif., a corporation of Delaware No Drawing. Application January 22, 1945, Serial No. 574,042

11 Claims. (Cl. 260—609)

This invention relates to a method for the production of thiophenols by reacting a cyclic ketone having a six-membered carbon ring with hydrogen sulfide.

More particularly, the invention comprises the process of reacting hydrogen sulfidie with a ketone having the carbonyl carbon atom embraced in the six-membered carbon cycle, in the presence of a catalyst at an elevated temperature, to produce a thiophenol.

The cyclic ketone having a six-membered carbon ring which may be reacted according to the process of the invention may be saturated or unsaturated. The unsaturated members may have one or two olefinic linkages between carbon atoms embraced in the cycle and/or one or more olefinic linkages between carbon atoms contained in substituents attached to the cycle. A suitable group of cyclic ketones comprises the cyclohexenones, and more preferably cyclohexen-2-one and the derivatives thereof having one or more of the hydrogen atoms replaced by one or more hydrocarbon radicals.

A particularly suitable group of cyclohexen-2-one derivatives which may be reacted to produce thiophenols comprises those wherein at least the 3,5,5-positions have been substituted by hydrocarbon radicals, and which may be represented by the formula

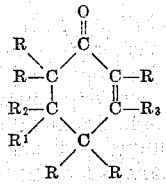

wherein R represents the hydrogen atom or a hydrocarbon radical and wherein $R_1$, $R_2$ and $R_3$ represent hydrocarbon radicals. The hydrocarbon radicals which $R_1$, $R_2$, $R_3$ and the R's may represent may be the same or different and represent cyclic or acyclic, saturated or unsaturated radicals which may be alkyl, aryl, alkenyl, alkaryl, alkenaryl, aralkyl, aralkenyl, cycloalkyl or cycloalkenyl. Suitable hydrocarbon radicals are methyl, ethyl, propyl, isopropyl, butyl, isobutyl, secondary butyl, tertiary butyl, amyl, benzyl, phenyl, xylyl, cresyl, vinyl, allyl, methallyl, crotyl, tiglyl, cyclopentyl, cyclohexenyl, cyclopentadienyl, and the like and their homologues and analogues. A preferred group of compounds is represented when the hydrocarbon radicals are of saturated character, for example the alkyl, aryl, alkaryl, aralkyl and cycloalkyl radicals; and a group of compounds which is particularly preferred is the 3,5,5-trialkyl cyclohexen-2-ones. Examples of suitable cyclic ketones are isophorone, 3,5,5-triethyl cyclohexen-2-one, 2,3,4,5-tetramethyl-5-ethyl cyclohexen-2-one, 2,4-diethyl-3,5-dimethyl-5-propyl cyclohexen-2-one, 3-ethyl-5,5-dimethyl cyclohexen-2-one, 3-methyl-5-ethyl-5-propyl cyclohexen-2-one, and the like and their homologues and analogues. Other cyclic ketones include 3,5,5-triphenyl cyclohexen-2-one, 3,5-dimethyl-5-vinyl cyclohexen-2-one, 3,5-diallyl-5-methyl cyclohexen-2-one, 3-benzyl-5,5-dimethyl cyclohexen-2-one, and the like and their homologues and analogues.

These cyclic ketones may be prepared by any suitable method known to the art. For example, many of the cyclohexenones may be prepared by the condensation of ketones, e. g. 3,5,5-trimethyl cyclohexen-2-one may be produced by the alkali catalyzed condensation of acetone, and similarly other cyclohexen-2-one derivatives may be produced by the condensation of methyl ethyl ketone, methyl propyl ketone, and the like, either alone or in combination.

The thiophenols produced by reacting the cyclic ketones with hydrogen sulfide according to the process of the invention may contain the same number of carbon atoms as the reactant ketone, for example cyclohexen-2-one may produce thiophenol. Or as in the case of the reaction of hydrogen sulfide with those cyclohexen-2-ones having hydrocarbon radicals in at least the 3,5 and 5 positions, the thiophenol produced may contain one or more less carbon atoms than the reactant ketone. For example, when isophorone is reacted with hydrogen sulfide according to the process of the invention, thioxylenol is produced; similarly when 3,5,5-triethyl cyclohexen-2-one is reacted, diethyl thiophenol may be formed; and so forth. The reaction conditions maintained and the catalysts employed in executing the reaction of hydrogen sulfide with the 3,5,5-trihydrocarbyl cyclohexen-2-one cause a hydrocarbon radical to be removed from the 3,5,5-trihydrocarbyl cyclohexen-2-one with the formation of a thiophenol containing fewer carbon atoms than the cyclic ketone reactant.

The term "thiophenols" is meant to include those compounds which contain at least one phenyl radical which is attached by a single bond to a sulfur atom which has its remaining bond linked to a hydrogen atom, and having the remaining 5 carbon atoms of the phenyl radical attached to members of the group consisting of the hydrogen atom and the hydrocarbon radicals.

The thiophenols may be represented by the formula

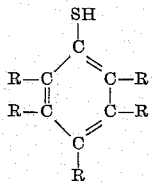

wherein R is a member of the group consisting of the hydrogen atom and the hydrocarbon radicals. Representative of the thiophenols which may be produced by execution of the process of the invention are thiophenol, thioxylenol, diethyl thiophenol, dipropyl thiophenol, trimethyl thiophenol, methyl ethyl thiophenol, phenyl thiophenol, diphenyl thiophenol, phenyl dimethyl thiophenol, and the like and their homologues and analogues. The specific thiophenol produced in any reaction will depend upon the specific cyclohexenone reacted.

An object of the invention is to provide thiophenols which find a multitude of uses for example as intermediates in organic syntheses, as insecticides, fungicides and parasiticides and as ingredients of insecticidal, fungicidal and parasiticidal compositions, and they may be used in the preparation of natural and synthetic resins, rubber, vulcanization accelerators, and the like. The thiophenols are particularly useful also as additives to lubricating oils.

The catalysts which are to be employed in the reaction may be termed dealkylation and/or dehydrogenation catalysts. Suitable catalysts include the oxides and sulfides of metals such as Cu, Mg, Ca, Zn, Cd, Ba, B, Al, La, Tl, Si, Ti, Zr, Sn, Pb, Pt, Th, V, Sb, Ta, Bi, Cr, Se, Mo, Te, W, U, Mn, Re, Fe, Co, Ni, Ru, Pd, Rh, Ce, Pr and others. The catalysts which may be used are preferably selected from the group comprising the metal oxides such as aluminum oxide, thorium oxide, zirconium oxide, zinc oxide, iron oxide, chromium oxide, manganese oxide, magnesium oxide, calcium oxide, barium oxide, etc. The catalyst may be a solid substance which has an active surface due to its chemical nature and/or to its degree of subdivision or amount of available reaction surface. The catalyst may be in the form of a fine powder, in the form of pellets or other formed pieces of suitable size, or it may be in the form of fragments of suitable size. Single catalysts or mixtures of different catalysts may be employed, and they may be used with or without promoters and/or active or inert supports such as pumice, silica gel, activated charcoal, kieselguhr, etc. It has been found that catalysts containing a substantial amount of aluminum oxide are particularly suitable for effecting the reaction of ketones with hydrogen sulfide to produce thiophenols in accordance with the process of the invention. Especially suitable is a catalyst consisting of or comprising an activated alumina, i. e. an adsorptive alumina, which consists predominantly of alumina alpha monohydrate and/or gamma alumina, and which may or may not be impregnated with or contain some other suitable substance, e. g. activated alumina impregnated with lesser amounts of ferric oxide. Alumina catalysts which are characterized by their highly active adsorptive properties may be obtained from natural sources or they may be prepared by synthetic means. An efficient catalyst may be prepared by treatment of natural bauxite ore. It is generally known that bauxites have different physical and chemical characteristics, depending upon the locale from which they are obtained and upon the subsequent treatment accorded them. For example, the calcination temperature has a decided effect on the surface area and the adsorptive capacity of the resultant catalyst; the iron which is present may be capable of removal by magnetic methods, so the iron content may vary within wide limits, depending on the specific treatment; and the water content of a bauxite varies according to the degree of calcination employed. Certain selected bauxites, such as the activated bauxite sold in the trade by the Porocel Corporation under the trade name "Porocel" are particularly efficient and in fact comprise one of the preferred catalysts to be employed in the present process, not only because they result in highly improved yields, but also because of the considerably lower costs of such bauxites. A selected activated bauxite such as Porocel possesses a long catalyst life as well as the ability to bring about excellent conversions to the thiophenol product. The selected activated bauxite sold under the trade name "Porocel," as well as the adsorptive aluminas having the general physical and chemical characteristics of Porocel, are particularly suitable as catalysts for the reaction of hydrogen sulfide with a cyclic ketone to produce thiophenols according to the process of the invention.

Other suitable catalysts consist of or comprise adsorptive aluminas prepared by synthetic means. These synthetic aluminas may be prepared from gels which may be peptized or unpeptized, but they are preferably prepared from the crystalline form such as the crystalline alpha alumina trihydrate crystallized from alkali aluminate solutions. A well known activated alumina is that sold by the Aluminum Ore Company under the trade name "Alorco" (grade A). A variety of suitable means for activating alumina are in existence, such as the ones described in U. S. Patents 1,868,869 and 2,015,593. The process of U. S. Patent 1,868,869 comprises subjecting to calcination, at a temperature of from 300° C. to 800° C., the deposit which forms in the precipitation tanks and discharge pipes used in the execution of the Fickes-Sherwin modification of the Bayer process. Other suitable methods of preparing and activating the alumina catalyst will be apparent to those skilled in the art.

As has been stated above, if desired, a catalyst may be used comprising an activated alumina and some other suitable metal or metal compound such as the metal oxides mentioned above which may or may not be in chemical combination with the activated alumina on the surface thereof. Some of these catalysts may be prepared by direct impregnation of the activated alumina with a solution of the compound which it is desired to incorporate in the surface thereof, while others can only be prepared indirectly, for example, by impregnation with one compound followed by a conversion treatment whereby said compound is converted to the desired compound. Particularly suitable compound catalysts are those comprising an activated alumina and one or more iron oxides such as the activated alumina containing iron oxide which may be purchased in the market under the trade name "Alorco" (grade B), and they comprise one of the preferred catalysts to be employed in the execution of the process of the invention. Other suitable compound catalysts include alumina impregnated with boria, for example by means of soaking alumina in e. g. boric acid, ammonium borate and the like and heating and calcining; or alumina impregnated with chromium oxide.

The process of the invention may be executed in any suitable type of apparatus, and the process may be carried out in a batchwise, intermittent or continuous manner. The reaction of the cyclic ketone with hydrogen sulfide will produce thiophenols at atmospheric or reduced pressure, but it has been found that for more substantial yields of thiophenols, a superatmospheric pressure is most desirable, particularly when the reactant cyclic ketones are the 3,5,5-trihydrocarbyl cyclohexen-2-ones. Any superatmospheric pressure may be used, but pressures of about 10 to about 50 atmospheres are in general efficient. It has been found convenient and effective to maintain a pressure of about 20 to 30 atmospheres.

The reaction may be carried out in the liquid or vapor phase, although the vapor phase is preferred for higher yields in most cases. Any elevated temperature may be used in the formation of thiophenols from the cyclic ketones, but in order to provide a reaction rate which is sufficiently high, and to bring about the production of more substantial yields, a temperature is desired at least high enough to bring the ketone into the vapor phase at the pressure maintained, but below that temperature which will bring about substantial decomposition of the reactants and/or products. In general, temperatures of about 300° C. to about 600° C. are sufficient, but temperatures of about 450° C. to about 550° C. are preferred for higher yields. During the course of the reaction of hydrogen sulfide with the unsaturated cyclic ketone to produce a thiophenol, there is also produced in most cases a corresponding cyclic thioketone. It has been discovered that the yield of the cyclic thioketone may be decreased and the yield of thiophenol correspondingly increased not only by the use of superatmospheric pressures, but also by maintaining a temperature substantially higher than the optimum temperature desirable for the formation of the cyclic thioketone. Temperatures which are at least about 40° C. to about 60° C. higher than the optimum temperature for the formation of the cyclic thioketone have been found effective in increasing the yield of thiophenol. For example, if a temperature of about 450° C. is efficient in the production of thioisophorone from isophorone, a temperature of about 500° C is more effective in increasing the yield of thioxylenol. The optimum temperature to be employed in any case will depend upon the specific cyclic ketone being reacted, upon the pressure maintained and upon the characteristics of the specific catalyst chosen.

The hydrogen sulfide and the cyclic ketone may be reacted in any proportion, but for higher yields and a more efficient process, it is generally desirable to use a molar excess of hydrogen sulfide over the cyclic ketone. A mole ratio of hydrogen sulfide to ketone of about 1:1 to about 8:1 will produce satisfactory results, although higher or lower mole ratios may be used. Mole ratios of hydrogen sulfide to cyclic ketone of about 3:1 to about 5:1 have been found effective in most cases.

Any convenient and practical flow rate may be employed. Combined ketone plus hydrogen sulfide flows of about 20 to about 80 moles per liter of catalyst per hour have been found satisfactory; however, higher or lower flow rates may be used. The reaction may be allowed to take place for any suitable length of time. Durations of from about one hour to about six hours are generally suitable, although longer or shorter runs may be desirable in some cases. The duration of the run may vary somewhat depending upon the reactants and upon the temperature and pressure conditions maintained. The reaction may be interrupted at any convenient point to introduce fresh catalyst, or to permit regeneration of the used catalyst which may be accomplished by any suitable known method. For example, any carbonaceous deposits which may be formed during the reaction may be burned off according to customary procedures.

The following examples serve to illustrate the execution of the process of the invention:

*Example I*

Hydrogen sulfide and isophorone in about a 4:1 mole ratio were reacted over a catalyst sold under the trade name "Porocel" at a temperature of about 500° C. at approximately atmospheric pressure and at a combined flow of about 50 moles per liter of catalyst per hour. About 15% of the recovered product comprised thioisophorone, about 5% was thioxylenol, and the remainder of the recovered product was largely unreacted isophorone and xylenol.

*Example II*

Hydrogen sulfide and isophorone in about a 3:1 mole ratio were reacted over a catalyst sold under the trade name "Porocel" at a temperature of about 500° C. at a pressure of about 400 pounds per square inch and at a combined flow of about 40 moles per liter of catalyst per hour. There resulted about a 13% conversion of isophorone to thioxylenol.

*Example III*

Hydrogen sulfide and 3,5,5-triethyl cyclohexen-2-one in about a 4:1 mole ratio are reacted over a catalyst sold under the trade name "Porocel" at a temperature of about 500° C. at a pressure of about 400 pounds per square inch and at a combined flow of about 40 moles per liter of catalyst per hour to obtain a good yield of diethyl thiophenol.

*Example IV*

Hydrogen sulfide and the unsaturated cyclic ketone prepared by the condensation of methyl ethyl ketone are reacted according to the process described in Example II to obtain a good yield of the corresponding thiophenol.

*Example V*

Hydrogen sulfide and 3-ethyl-5,5-dimethyl cyclohexen-2-one in about a 3:1 mole ratio are reacted over a catalyst sold under the trade name "Alorco" (grade B) at a temperature of about 500° C., at a pressure of about 400 pounds per square inch and at a combined flow of about 40 moles per liter of catalyst per hour to obtain a good yield of methyl ethyl thiophenol.

*Example VI*

Hydrogen sulfide and 3-butyl-5,5-diethyl cyclohexen-2-one are reacted in about a 4:1 mole ratio over a catalyst sold under the trade name "Alorco" (grade A) at a temperature of about 525° C. at a pressure of about 400 pounds per square inch and at a combined flow of about 50 moles per liter of catalyst per hour to obtain a good yield of butyl ethyl thiophenol.

The term "hydrocarbyl" as used throughout the specification and claims is to be understood to mean the monovalent radical derived by subtracting one hydrogen atom from a hydrocarbon which may be cyclic or acyclic, saturated or unsaturated.

This application is a continuation-in-part of co-pending application, Serial Number 540,750, filed June 16, 1944 now Patent No. 2,437,985.

We claim as our invention:

1. A process for the production of thioxylenol which comprises reacting hydrogen sulfide with 3,5,5-trimethyl cyclohexen-2-one in the presence of a catalyst comprising crystalline alumina alpha monohydrate prepared by partial dehydration of crystalline alpha alumina trihydrate crystallized from alkali aluminate solutions, at a pressure between about 20 atmospheres and about 30 atmospheres at a temperature between about 450° C. and about 550° C.

2. A process for the production of diethyl thiophenol which comprises reacting hydrogen sulfide with 3,5,5-triethyl cyclohexen-2-one in the presence of a catalyst comprising an activated bauxite at a pressure between about 20 atmospheres and about 30 atmospheres at a temperature between about 450° C. and about 550° C.

3. A process for the production of thioxylenol which comprises reacting hydrogen sulfide with 3,5,5-trimethyl cyclohexen-2-one in the presence of a catalyst comprising an activated bauxite at a pressure between about 20 atmospheres and about 30 atmospheres at a temperature between about 450° C. and about 550° C.

4. A process for the production of a dialkyl thiophenol which comprises reacting hydrogen sulfide with a 3,5,5-trialkyl cyclohexen-2-one in the presence of a catalyst comprising an activated alumina at a pressure between about 10 atmospheres and about 50 atmospheres and at a temperature between about 450° C. and about 550° C.

5. A process for the production of a thiophenol which comprises reacting hydrogen sulfide with a 3,5,5-trialkyl cyclohexen-2-one in the presence of an activated alumina at a pressure between about 10 atmospheres and about 50 atmospheres and at a temperature between about 300° C. and about 600° C.

6. A process for the production of a thiophenol which comprises reacting hydrogen sulfide with a 3,5,5-trialkyl cyclohexen-2-one in the presence of an activated alumina at a superatmospheric pressure and at a temperature between about 300° C. and about 600° C.

7. A process for the production of a thiophenol which comprises reacting hydrogen sulfide with a compound of the formula

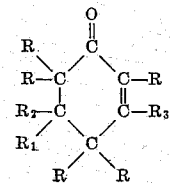

wherein R represents a member of the group consisting of the hydrogen atom and the hydrocarbon radicals and wherein $R_1$, $R_2$ and $R_3$ represent hydrocarbon radicals, in the presence of a metal oxide dealkylation catalyst at a superatmospheric pressure and at a temperature between about 300° C. and about 600° C.

8. A process for the production of thiophenol which comprises reacting hydrogen sulfide with cyclohexen-2-one in the presence of an activated alumina at a superatmospheric pressure and at a temperature between about 300° C. and about 600° C.

9. A process for the production of a thiophenol which comprises reacting hydrogen sulfide with a cyclohexenone composed solely of carbon, hydrogen, and the one oxygen, atoms, in the presence of an activated alumina at a superatmospheric pressure and at a temperature between about 300° C. and about 600° C.

10. A process for the production of a thiophenol which comprises reacting hydrogen sulfide with a monocyclic ketone having a single carbonyl carbon atom embraced in a six membered carbon cycle, said ketone being composed solely of carbon, hydrogen, and the one oxygen, atoms, in the presence of a catalyst comprising aluminum oxide at a superatmospheric pressure and at a temperature between about 300° C. and about 600° C.

11. A process for the production of a thiophenol which comprises reacting hydrogen sulfide with a monocyclic ketone having a single carbonyl carbon atom embraced in a six-membered carbon cycle, said ketone being composed solely of carbon, hydrogen, and the one oxygen, atoms, in the presence of a metal oxide dealkylation catalyst at a temperature between about 300° C. and about 600° C. and at a superatmospheric pressure.

DE LOSS E. WINKLER.
SEAVER A. BALLARD.

REFERENCES CITED

The following references are of record in the file of this patent:

UNITED STATES PATENTS

| Number | Name | Date |
|---|---|---|
| 2,116,182 | Bauer | May 3, 1938 |

OTHER REFERENCES

Sen: "Journal Ind. Chem. Soc.," vol. 13, pages 268–72 (1936); ibid., vol. 12, pages 647–52 (1935).